Nov. 13, 1945.  J. KUZMICK  2,389,061

POWDERED METAL BODY AND METHOD OF MAKING SAME

Filed April 8, 1941

Inventor:
Jerome Kuzmick,
By: Lee J. Gary
Attorney

Patented Nov. 13, 1945

2,389,061

UNITED STATES PATENT OFFICE 2,389,061

POWDERED METAL BODY AND METHOD OF MAKING SAME

Jerome Kuzmick, Bridgeport, Conn., assignor to Raybestos-Manhattan, Inc., Bridgeport, Conn., a corporation of New Jersey Application April 8, 1941, Serial No. 387,468

8 Claims. (Cl. 29—181)

This invention relates to improvements in friction materials of the type containing powdered metal, and refers particularly to a powdered metal friction material having a fused or partially fused or vitrified ceramic binder and the method of making same.

Friction materials have heretofore been proposed having high percentages of powdered metal, the materials being characterized in that the powdered metal or metals are sintered to form an unbroken or continuous network. To increase the frictional characteristics of such materials, friction augmenting agents are incorporated with the powdered metal in the form of mechanically entrapped inclusions carried by the network.

Such friction materials have several serious defects, for instance, the friction range is limited because the amount of friction augmenting material which can be incorporated into the metallic network is limited. If more than a small percentage of the friction augmenting material is employed, the finished product is too weak and crumbly to be durable enough for use. In addition, in service, the effectiveness of these entrapped materials is considerably reduced either by their mechanical removal, or by their becoming coated with a metallic film due to the burnishing or flowing action of the metallic network. This action becomes increasingly apparent as the temperature of the friction surface increases in service, and the result is a considerable loss in friction, or "fade." Further, sintered metallic friction materials have a tendency to "seize" which is probably due to the burnished metallic film.

In the present invention a continuous or unbroken metallic network is not formed. The ceramic material performs the dual function of binder and friction augmenting agent and its proportions may be varied widely, giving a wide variation in friction characteristics without weakening the structure or rendering it friable or crumbly. In addition, since the ceramic and metallic constituents are firmly bonded together, the metallic network and its hereinbefore mentioned burnishing effect are eliminated. As a result, the frictional characteristics remain substantially constant over wide variations of operating temperatures.

Figure 1:
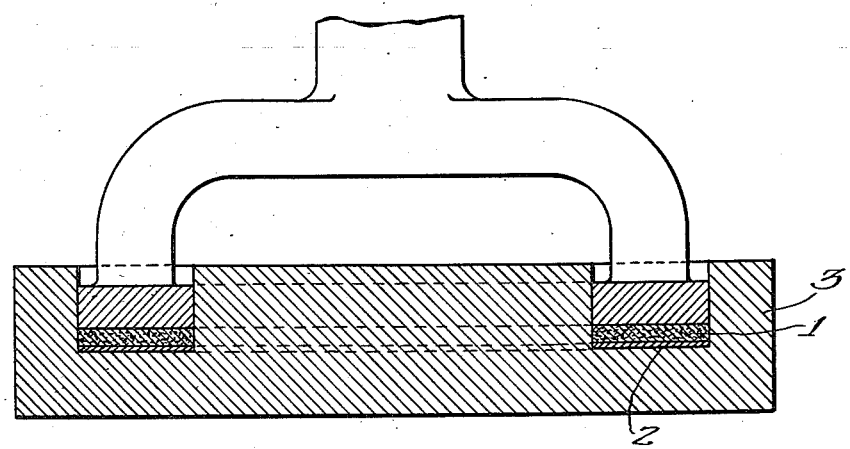
Fig. 1 is a sectional elevational view illustrating the pressing of my friction material in a mold.
Figure 2:
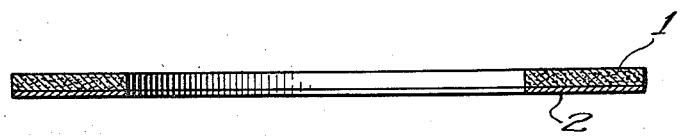
Fig. 2 is a sectional elevational view of a finished clutch facing having a backing plate secured thereto.
Figure 3:
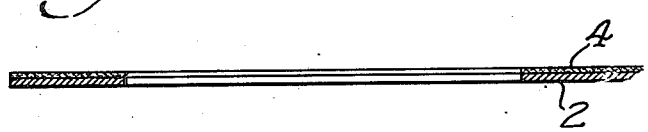
Fig. 3 is a sectional elevational view of a backing plate having a coating ceramic material thereon.

Briefly described, the present invention contemplates a friction material which comprises a substantially homogeneous mixture of powdered metal or metals having a melting point below about 2800° F., and a fusible or vitrifiable ceramic-type material, the ceramic material being employed in the dual capacity of binder and friction augmenting agent. The mixture is briquetted or compacted under heat and pressure to densify the structure and fuse or partially fuse or vitrify the ceramic material. The briquette or wafer thus formed may be employed as the friction element alone or may be secured to a solid metal backing plate.

In carrying out the process a relatively ductile powdered metal or metals having a melting point below about 2800° F., and preferably above about 1000° F., such as aluminum, copper or iron, or alloys falling within the limits of melting points herein set forth, are mixed with an inorganic, non-metallic substance capable of fusion or vitrification, such as kaolin, bentonite, sodium silicate, enamel frit or the like in powdered form. While satisfactory bonding can be secured with almost any particle size of ceramic material, it is usually desirable to use a rather fine powder, such as 300 mesh, in order to secure good dispersion of the ceramic material throughout the mix. If desired, a proportion of lubricating material such as powdered graphite or lead may also be used. After thorough mixing, the mixture 1 is cold-pressed in a mold 3 into wafers or briquettes. The pressures used are upward from 5,000 pounds per square inch, but the preferred range of pressure is between about 10,000 and 30,000 pounds per square inch. The wafers are then heat treated at temperatures ranging between about 1200 to 1800° F., under a relatively low pressure of between about 50 to 500 pounds per square inch. If an easily oxidizable metal powder such as copper is employed in the mix, a protective or inert atmosphere of hydrogen, carbon monoxide, or the like may be maintained in the heat treating furnace.

The heat treating operation causes vitrification or partial vitrification (depending upon the temperature) of the ceramic material. As a result the ceramic material cements together the metallic particles. Some sintering of some of the metallic particles may take place, but as a whole the element comprises essentially discrete metallic particles bonded together by the ceramic binder. Of course, the degree of sintering will depend upon the type and quantity of non-metallic binder and metallic particles employed. However, it is not intended that a continuous network of sintered metal particles exist within the element.

The amount of fusible or vitrifiable ceramic material employed will depend primarily upon the frictional characteristics desired in the finished product, and will range from about 5 to 40 percent by volume of the mix. If desired, relatively small percentages of low melting point metals, that is, metals having a melting point below about 1000° F., such as tin, lead, zinc of alloys thereof, which may function primarily as lubricants, may be employed. Relatively small percentages of fluxing materials, such as lime, sodium carbonate, sodium nitrate or the like, may be employed to promote vitrification of the ceramic binder.

If desired, the cold-pressed wafers or briquettes may be heat treated, as hereinbefore described, while in contact with a solid metal backing plate 2 such as a steel plate, in which case a composite sintered-ceramic bond will unite the wafer to the plate. The bond will consist partially of the sintering of the exposed metal particles to the plate surface and partially to the ceramic material adhering to the plate surface. The fluxing materials, hereinbefore described, promote the latter type bond. The backing plate, if desired may be sprayed or painted with a suspension of the powdered ceramic material in water and dried, leaving the plate coated with a layer 4 of the ceramic material. The plate may then be heated in contact with the friction wafer, and the ceramic material vitrifying or fusing, cements the backing plate and friction wafer.

In production, a plurality of cold-pressed wafers may be alternately stacked with the backing plates in a furnace and a plurality of backed friction elements may be formed simultaneously. If substantial reliance is placed upon the sintering of the exposed metal particles to the surface of the backing plate as a bond, a protective or inert atmosphere is preferably used in the furnace. However, if the bond is primarily due to the ceramic material, which is unaffected by oxygen, such rigid control of the furnace atmosphere is unnecessary.

The following are typical examples of a friction material made in accordance with the present invention, and are submitted for purposes of illustration, but are not intended to indicate limitations.

*Example I*

| Constituents | Per cent by volume |
| --- | --- |
| Copper | 50 |
| Lead | 5 |
| Tin | 5 |
| Graphite | 10 |
| Clay (bentonite) | 30 |

The above mix was subjected to pressure of 18,000 pounds per square inch in a suitable mold, the pressing being carried out at atmospheric temperature. Subsequently, the wafer thus formed was heat treated at a temperature of 1600° F., in an atmosphere of carbon monoxide under a pressure of 100 pounds per square inch (while said wafer was maintained in contact with a steel backing plate). The resulting product is ideally adapted as an automotive clutch facing.

*Example II*

| Constituents | Per cent by volume |
| --- | --- |
| Copper | 50 |
| Lead | 5 |
| Graphite | 15 |
| Silica | 10 |
| Enamel frit | 20 |

A wafer was molded from the above mix at 20,000 pounds per square inch and the wafer was heat treated at 1400° F., under 150 pounds per square inch pressure in an atmosphere of carbon monoxide while in contact with a backing plate with an enamel frit coating.

*Example III*

| Constituents | Per cent by volume |
| --- | --- |
| Copper | 40 |
| Iron | 10 |
| Lead | 5 |
| Tin | 5 |
| Graphite | 15 |
| Silica | 10 |
| Enamel frit | 15 |

A wafer was molded from the above mix at 20,000 pounds per square inch and the wafer was heat treated at 1400° F., under 150 pounds per square inch pressure in an atmosphere of carbon monoxide while in contact with a steel backing plate.

Friction elements made in accordance with the present invention are exceptionally strong; can be made with a wide range of friction characteristics; will withstand relatively high temperatures without fading or disintegrating; are substantially unaffected by moisture, and have a somewhat lower overall specific gravity than so-called all-metal facings, that is, facings of the sintered type.

My material, although ideally adapted for friction materials, may also be used for other metal powder products, such as gears, bushings, bearings, contact points and the like, where extremely high strengths are not required.

I claim as my invention:

1. A friction element which comprises a friction facing including a compacted substantially homogeneous mixture of a powdered metal, and a ceramic binder, said binder being in substantially fused or vitrified condition, said facing being united to a solid metal backing plate by sintered metal particles and by said substantially fused or vitrified ceramic binder.

2. A process of making a friction element which comprises subjecting a substantially homogeneous mixture including a powdered metal and a fusible or vitrifiable ceramic material to a pressure of about 5,000 to 30,000 pounds per square inch to form a compacted body, applying a layer of an aqueous suspension of a fusible or vitrifiable ceramic material to a face of a metal plate, heating said compacted body in contact with said layer to fuse or vitrify both the ceramic material contained in the body and the ceramic material of said layer to bind the metal particles of the body together and bond the compacted body to the metal plate.

3. A process for making friction materials which comprises: subjecting a substantially homogeneous mixture of about 50% copper, 5% lead, 15% graphite, 10% silica and 20% enamel frit all by volume to a pressure of about 20,000 pounds per square inch to form a compacted body, and then heating said compacted body at a temperature of about 1400° F. in an inert atmosphere at a pressure of about 150 pounds per square inch.

4. A friction element which comprises a friction facing including a compacted substantially homogeneous mixture of a powdered metal and a ceramic binder bonded by sintered metal particles and substantially fused or vitrified ceramic binder, said facing being united to a solid metal backing plate by sintered metal particles and by said susbtantially fused or vitrified ceramic binder.

5. A composite friction element comprising: a compacted homogeneous mixture including the following finely divided metals and ceramic material, in about the proportions specified: copper 50%, lead 5%, graphite 15%, silica 10% and enamel frit 20%, all by volume said enamel frit being fused and binding the metal particles together.

6. A process for making friction materials, comprising: subjecting a substantially homogeneous mixture including 5 to 40% by volume of fusible or vitrifiable ceramic material and the remainder essentially powdered metal, to a pressure of 5000 to 30,000 pounds per square inch at atmospheric temperature to form a compacted body; placing said compacted body in contact with a metallic backing plate; and then subjecting said compacted body and backing plate to heat at a vitrifying temperature for said ceramic material between about 1200 to 1800° F. at a pressure of 50 to 500 pounds per square inch.

7. A process for making friction materials, comprising: subjecting a substantially homogeneous mixture including 5 to 40% by volume of fusible or vitrifiable ceramic material and the remainder essentially powdered metal, to a pressure of 5000 to 30,000 pounds per square inch at atmospheric temperature to form a compacted body; precoating a metal backing plate with fusible ceramic material placing said compacted body in contact with said precoated backing plate; and then subjecting said compacted body and coated backing plate to heat at a vitrifying temperature for said ceramic material between about 1200 to 1800° F. at a pressure of 50 to 500 pounds per square inch.

8. A composite friction element comprising: a compacted homogeneous mixture including the following finely divided metals and ceramic material, in about the proportion specified: copper 50%, lead 5%, graphite 15%, silica 10%, and enamel frit 20%, all by volume; and a metal backing plate bonded to said friction element, said enamel frit being fused and binding the metal particles together and binding said friction element to said backing plate.

JEROME KUZMICK.